United States Patent
Igarashi et al.

(10) Patent No.: US 12,152,918 B2
(45) Date of Patent: Nov. 26, 2024

(54) ASSIST GAS FLOW RATE CALCULATION DEVICE AND CALCULATION METHOD

(71) Applicant: AMADA CO., LTD., Kanagawa (JP)

(72) Inventors: Kaori Igarashi, Kanagawa (JP); Shigeaki Kitaoka, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 878 days.

(21) Appl. No.: 17/290,928

(22) PCT Filed: Oct. 24, 2019

(86) PCT No.: PCT/JP2019/041611
§ 371 (c)(1),
(2) Date: May 3, 2021

(87) PCT Pub. No.: WO2020/095690
PCT Pub. Date: May 14, 2020

(65) Prior Publication Data
US 2021/0404847 A1    Dec. 30, 2021

(30) Foreign Application Priority Data
Nov. 9, 2018   (JP) ................................ 2018-211174

(51) Int. Cl.
*G01F 1/42*    (2006.01)
*B23K 26/14*   (2014.01)

(52) U.S. Cl.
CPC ............ *G01F 1/42* (2013.01); *B23K 26/1437* (2015.10)

(58) Field of Classification Search
CPC ..... G01F 1/42; G01F 1/40; G01F 1/36; G01F 1/34; G01F 1/05; G01F 1/00; G01F 1/363;
(Continued)

(56) References Cited

U.S. PATENT DOCUMENTS 5,786,561 A  *  7/1998  Zefferer ............... B23K 26/125
                                                                219/121.84
10,759,005 B2 * 9/2020  Hara ..................... B23K 26/046

FOREIGN PATENT DOCUMENTS

| JP | 52-106114 A | 9/1977 | |
| JP | 09168885 A | * 6/1997 | ............ B23K 26/14 |
| JP | 2017-39141 A | 2/2017 | |

OTHER PUBLICATIONS

Yamada et al. "Development of Remote Sampling ESI Mass Spectrometry for the Rapid and Automatic Analysis of Multiple Samples", 2016, University of Yamanashi, vol. 5, pp. 1-6. (Year: 2016).*

(Continued)

*Primary Examiner* — Mohamed Charioui
(74) *Attorney, Agent, or Firm* — Renner, Otto, Boisselle & Sklar, LLP

(57) ABSTRACT

Storage units 60, 70 store a first computer program calculating a flow rate of an assist gas with a linear function having a pressure of the assist gas in a processing head 35 as a variable, and a second computer program calculating a slope of the linear function with a function having a gap G from a tip end of a nozzle 36 to a surface of a workpiece W as a variable. A control unit 50 substitutes a value of the gap G into the function to calculate the slope of the linear function and substitutes the slope of the linear function and a value of the pressure of the assist gas into the linear function to calculate the flow rate of the assist gas.

15 Claims, 8 Drawing Sheets

(58) Field of Classification Search
CPC ............ B23K 26/1437; B23K 26/1435; B23K 26/14; B23K 26/00
See application file for complete search history.

(56) References Cited

OTHER PUBLICATIONS

International Search Report for corresponding Application No. PCT/JP2019/041611, mailed Dec. 24, 2019.
Written Opinion for corresponding Application No. PCT/JP2019/041611, mailed Dec. 24, 2019.
Office Action issued on Dec. 18, 2019 in the counterpart Japanese Application No. 2018-211174.

* cited by examiner

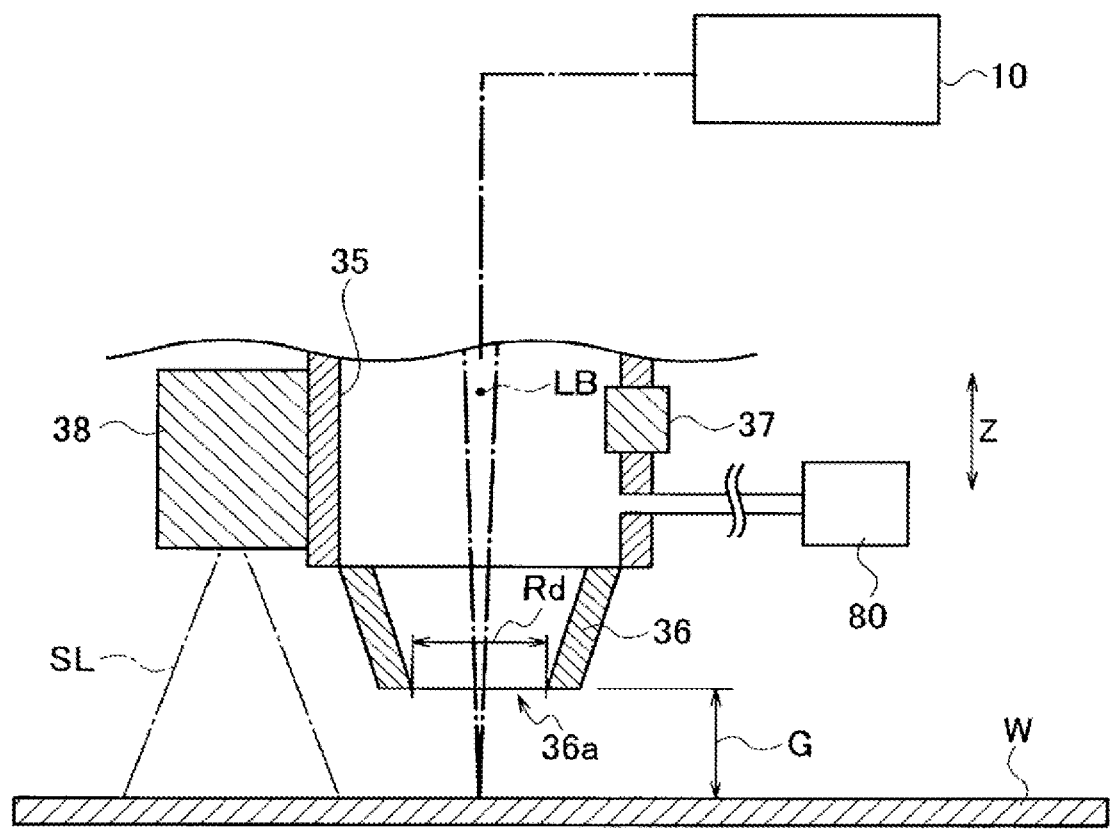

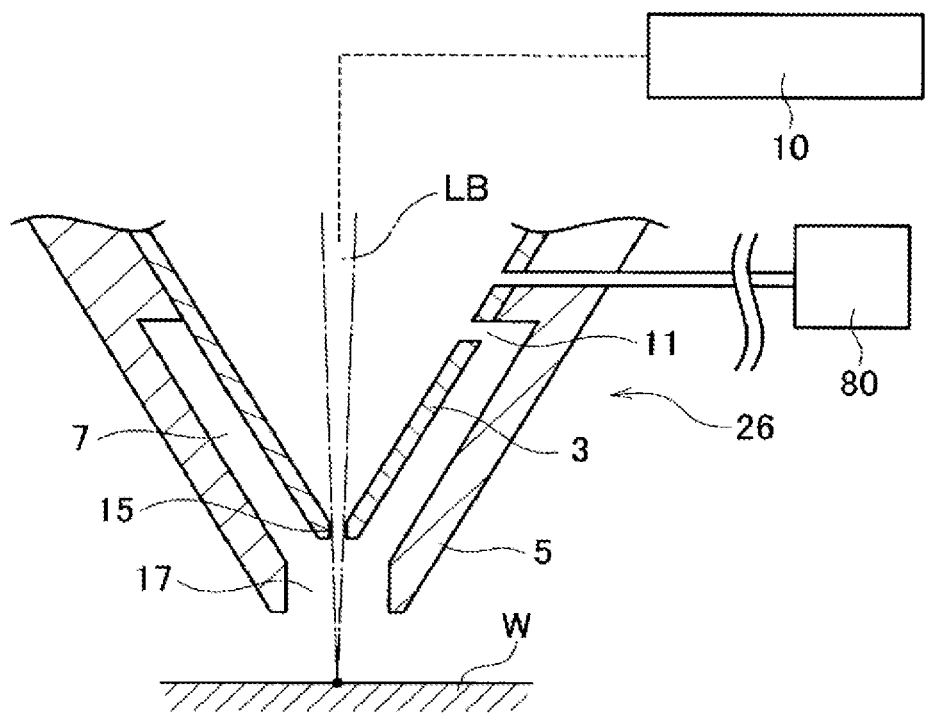

DIAMETER OF OPENING OF SINGLE NOZZLE AND SLOPE

CROSS-SECTIONAL AREA OF OPENING OF SINGLE NOZZLE AND SLOPE

DIAMETER OF OPENING OF DOUBLE NOZZLE AND SLOPE

CROSS-SECTIONAL AREA OF OPENING OF DOUBLE NOZZLE AND SLOPE

ASSIST GAS FLOW RATE CALCULATION DEVICE AND CALCULATION METHOD

TECHNICAL FIELD

The present invention relates to a calculation device and a calculation method for/of calculating a flow rate of an assist gas in laser processing.

BACKGROUND ART

In laser processing in which a laser beam guided from a laser oscillator to a processing head is applied on a workpiece to perform desired processing, an assist gas is ejected together with a laser beam from a nozzle attached to a tip end of the processing head. The processing quality of laser processing is greatly affected not only by the type of the assist gas, but also by the flow rate of the assist gas. For this reason, the flow rate of the assist gas has been conventionally controlled (see Patent Literature 1, for example).

Patent Literature 1 discloses that the flow rate of the assist gas depends on an opening area of the nozzle and a pressure of the assist gas, and a distance (gap value) between the nozzle and the workpiece should be taken into consideration for more strict control of the flow rate (see Patent Literature 1 (page 11, paragraph 0052)).

CITATION LIST

Patent Literature

Patent Literature 1: Japanese Laid-Open Patent Publication No. 9-168885

SUMMARY

Technical Problem

In Patent Literature 1, a region (high workability region) where excellent laser processing can be performed in a P (pressure)-S (opening area) plane is determined in advance for each gap value, and the flow rate of the assist gas is controlled based on the high workability region. However, no specific calculation method and calculation formula for calculating the flow rate of the assist gas while taking the gap value into consideration have been disclosed or suggested.

It is an object of the present invention to accurately calculate the flow rate of the assist gas in laser processing.

Solution to Problem

One aspect of the present invention is a device for calculating a flow rate of an assist gas ejected from a tip end of a nozzle attached to a processing head in laser processing in which a laser beam guided from a laser oscillator to the processing head is applied on a workpiece to perform desired processing. The assist gas flow rate calculation device includes a control unit and a storage unit. The storage unit stores a first computer program calculating the flow rate using a linear function having a pressure of the assist gas in the processing head as a variable, and a second computer program calculating a slope of the linear function using a function having a gap from the tip end of the nozzle to a surface of the workpiece as a variable. Further, the control unit is configured to acquire data indicating a value of the gap, calculate the slope of the linear function by substituting the value of the gap into the function to execute the second computer program, acquire data showing a value of the pressure of the assist gas, and calculate the flow rate of the assist gas by substituting the slope of the linear function and the value of the pressure of the assist gas into the linear function to execute the first computer program.

Advantageous Effect of Invention

According to the assist gas flow rate calculation device and calculation method in laser processing of the present invention, the flow rate of the assist gas in laser processing can be calculated accurately.

BRIEF DESCRIPTION OF DRAWINGS

FIG. 2 is a schematic view showing a pressure gauge 37 and a gap measuring instrument 38 attached to a processing head 35.

FIG. 6 is a cross-sectional view showing a structure of a double nozzle 26 and a flow path of the assist gas.

DESCRIPTION OF EMBODIMENTS

First Embodiment

<Laser Processing Machine>

Hereinafter, an embodiment of an assist gas flow rate calculation device and an assist gas flow rate calculation method will be described with reference to the attached drawings. Before describing the assist gas flow rate calculation device and the assist gas flow rate calculation method, an example of laser processing machines that perform laser processing using an assist gas will be described. Obviously, a laser processing machine described here is an example of apparatuses to which the assist gas flow rate calculation device and the assist gas flow rate calculation method can be applied, and is not intended to limit the laser processing machines.

Figure 1:
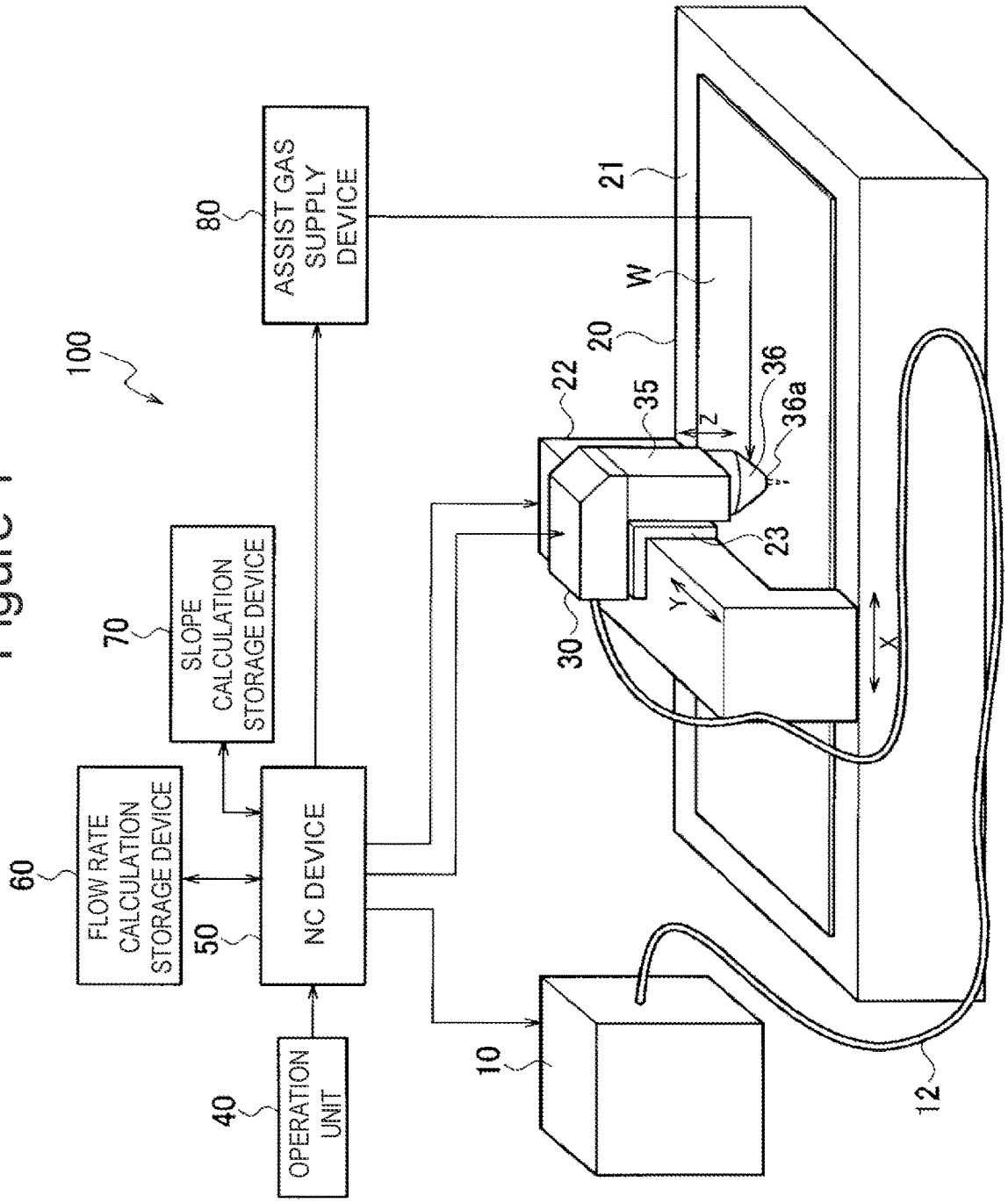
FIG. 1 is a view showing an overall configuration example of a laser processing machine according to an embodiment.

In FIG. 1, a laser processing machine 100 includes a laser oscillator 10 that generates and emits a laser beam, a laser processing unit 20, and a process fiber 12. The laser processing machine 100 further includes an operation unit 40, an NC device 50, a flow rate calculation storage device 60, a slope calculation storage device 70, an assist gas supply device 80, and a display unit 90.

The laser oscillator 10 is preferably a laser oscillator that amplifies an excitation beam originated from a laser diode to emit a laser beam having a predetermined wavelength, or a laser oscillator that directly uses a laser beam originated from a laser diode. Examples of the laser oscillator 10 include a solid-state laser oscillator, a fiber laser oscillator, a disk laser oscillator, and a direct diode laser oscillator (DDL oscillator).

The laser oscillator 10 emits a laser beam having a width of 1 μm in a wavelength range of 900 nm to 1100 nm. For the fiber laser oscillator and the DDL oscillator, by way of example, the fiber laser oscillator emits a laser beam in a wavelength range of 1060 nm to 1080 nm and the DDL oscillator emits a laser beam in a wavelength range of 910 nm to 950 nm.

The process fiber 12 transmits the laser beam emitted from the laser oscillator 10 to the laser processing unit 20.

The laser processing unit 20 includes a processing table 21 on which a sheet metal W (an example of workpieces) to be processed is placed, a gate-type X-axis carriage 22, a Y-axis carriage 23, a collimator unit 30 fixed to the Y-axis carriage 23, and a processing head 35.

The collimator unit 30 includes an optical system having a plurality of lenses and mirrors and converts a divergent laser beam emitted from the process fiber 12 into a parallel beam (collimated beam) and converges it on the sheet metal W.

The laser beam converged by the collimator unit 30 is guided to the processing head 35. A nozzle 36 is attached to a tip end of the processing head 35. A tip end of the nozzle 36 has a circular opening 36a formed therein, through which the laser beam is emitted. The laser beam emitted through the opening 36a of the nozzle 36 is applied on the sheet metal W.

The assist gas supply device 80 supplies the processing head 35 with nitrogen, oxygen, a mixed gas of nitrogen and oxygen, or air as an assist gas. In processing the sheet metal W, the assist gas is blown onto the sheet metal W through the opening 36a. The assist gas discharges molten metal, which results from melting of the sheet metal W, within a kerf width. If a flow rate of the assistant gas is insufficient, the molten metal cannot be discharged. On the other hand, if the flow rate of the assistant gas is excessive, a running cost of laser processing increases. Hence, the flow rate of the assist gas should be appropriately controlled in laser processing.

The X-axis carriage 22 is configured to be movable in the X-axis direction on the processing table 21. The Y-axis carriage 23 is configured to be movable in the Y-axis direction, which is perpendicular to the X-axis, on the X-axis carriage 22. The X-axis carriage 22 and the Y-axis carriage 23 function as a moving mechanism for moving the processing head 35 across a surface of the sheet metal W in the X-axis direction, in the Y-axis direction, or in any combined direction of the X-axis and the Y-axis.

Instead of moving the processing head 35 across the surface of the sheet metal W, the processing head 35 may be fixedly located and the sheet metal W may move. The laser processing machine 100 may include any moving mechanism as long as the moving mechanism allows a relative movement of the processing head 35 and the surface of the sheet metal W.

The NC device 50 is an example of a control device that controls each part of the laser processing machine 100, and includes a microcontroller having a CPU, a memory, and an input/output unit, for example. The NC device 50 can perform desired processing such as cutting and drilling in the sheet metal W by controlling each part of the laser processing machine 100 according to predetermined processing programs and processing conditions.

FIG. 2 shows a pressure gauge 37 and a gap measuring instrument 38 attached to the processing head 35. The assist gas supplied by the assist gas supply device 80 is introduced into the processing head 35 and the nozzle 36 attached to the tip end of the processing head 35, and is blown onto the sheet metal W through the opening 36a. The laser beam converged by the collimator unit 30 passes through the inside of the processing head 35 and the nozzle 36, and is then applied on the sheet metal W.

The pressure gauge 37 and the gap measuring instrument 38 are attached to the processing head 35. The pressure gauge 37 measures a pressure of the assist gas inside the processing head 35 and the nozzle 36. For example, elastic pressure gauges such as a Bourdon tube pressure gauge, a diaphragm pressure gauge, a bellows pressure gauge, and a chamber pressure gauge may be used.

The gap measuring instrument 38 measures a distance (hereinafter referred to as "gap (G)") in the Z-axis direction from the tip end of the nozzle 36 to the surface of the sheet metal W. Specifically, a tracking sensor using a laser beam SL can be used as the gap measuring instrument 38. The laser beam SL is applied on a portion of the sheet metal W different from a portion irradiated with a laser beam LB and the assist gas, and reflected ray is detected by a photodetector. The distance to the surface of the sheet metal W is measured by the principle of triangulation. Because coordinates of the tip end of the nozzle 36 with respect to the gap measuring instrument 38 in the Z-axis direction are predetermined, the gap from the tip end of the nozzle 36 to the surface of the sheet metal W can be measured.

Here, a single function laser machine is illustrated as an example of the laser processing machine. However, the laser processing machine may also include a combination laser machine in which a laser processing machine is combined with a processing machine for performing processing other than laser processing of the sheet metal, for example, a "punch and laser combination machine" in which a laser processing machine is combined with a punching machine. In other words, the assist gas flow rate calculation device according to one embodiment can be applied to not only a single function laser machine but also a combination laser machine.

<Assist Gas Flow Rate Calculation Device and Calculation Method>

Next, the assist gas flow rate calculation device and calculation method used in the laser processing machine shown in FIG. 1 and FIG. 2 will be described.

In one embodiment, the NC device 50 functions not only as a control device that controls each part of the laser processing machine 100, but also as a part (control unit) of the assist gas flow rate calculation device. By executing a preinstalled computer program (assist gas flow rate calculation program), the NC device 50 (control unit) constitutes a plurality of information processing circuits included in the assist gas flow rate calculation device and performs the assist gas flow rate calculation method. Here, an example is shown in which both the control device controlling each part of the laser processing machine 100 and a part of the assist gas flow rate calculation device are implemented in the same hardware (NC device 50). However, the present invention is not limited thereto and a part (control unit) of the assist gas flow rate calculation device may be implemented by using hardware (another microcontroller) different from the NC device 50.

The assist gas flow rate calculation device (hereinafter, simply referred to as "calculation device" in some cases) further includes a secondary storage device (storage unit) for storing electronic data, in addition to the plurality of information processing circuits (control unit). For example, an example will be described in which the calculation device includes a flow rate calculation storage device 60, and a slope calculation storage device 70. Obviously, the number and type (hard disk, CD-ROM, flash memory, removable storage medium) of the secondary storage device are not limited. As another example, the storage unit may be a primary storage device (cache memory, register, RAM) in the NC device 50.

The flow rate calculation storage device 60 stores a first computer program (first algorithm) that calculates a flow rate (H) of an assist gas using a linear function (F1) having a pressure (P) of the assist gas in the processing head 35 as a variable. Equation (1) is an example of the linear function (F1) having the pressure (P) of the assist gas as a variable. "α" in Equation (1) is a proportional coefficient of the pressure P of the assist gas, that is, a slope of the linear function (F1). "β" in Equation (1) is a proportional intercept. As represented in Equation (1), in one embodiment, the flow rate (H) of the assist gas and the pressure (P) of the assist gas are in a proportional relationship. The calculation device calculates the flow rate (H) of the assist gas using a first order polynomial of the pressure (P) of the assist gas.

$$H = \alpha \times P + \beta \quad \text{Equation (1)}$$

The slope calculation storage device 70 stores a second computer program (second algorithm) that calculates the slope (α) of the linear function (F1) described above by using a function (F2) having the gap (G) from the tip end of the nozzle 36 to the surface of the sheet metal W as a variable. Equation (2) represents a general expression of the function (F2) having the gap (G) as a variable. As represented in Equation (2), in one embodiment, the calculation device calculates the slope (α) of the linear function (F1) using a n-th order polynomial of the gap (G). Here, "$a_k$" is a coefficient of a k-th order term of the gap (G). "n" is zero or a positive integer. If the gap (G) is lower than a certain value (threshold $G_{TH}$), "n" in Equation (2) is a positive integer. On the other hand, if the gap (G) is equal to or higher than a predetermined value (threshold $G_{TH}$), "n" in Equation (2) is zero. In other words, as represented in Equation (3), the slope (α) of the linear function (F1) is a constant ($a_0$).

[Expression 1]

$$\alpha = \Sigma_{k=0}^{n} a_k G^k \, (G < G_{TH}) \quad \text{Equation (2)}$$

[Expression 2]

$$\alpha = a_0 \, (G = G_H, G > G_{TH}) \quad \text{Equation (3)}$$

As represented in Equation (1) and Equation (2), in the first embodiment, the flow rate (H) of the assist gas changes according to the pressure (P) and the gap (G) of the assist gas. The calculation device calculates the flow rate (H) of the assist gas by using the linear function (F1) having the pressure (P) of the assist gas as a variable and the function (F2) having the gap (G) as a variable.

The threshold ($G_{TH}$) is the largest value of the gap in a range of the gap (G) in which the flow rate of the assist gas changes as the gap (G) changes. In other words, the threshold ($G_{TH}$) is the smallest value of the gap in a range of the gap (G) in which the flow rate of the assist gas does not change as the gap (G) changes.

The linear function (F1) having the pressure (P) of the assist gas as a variable, the function (F2) having the gap (G) as a variable, and the threshold ($G_{TH}$) change depending on the type and shape of the nozzle 36, in particular the shape, diameter (reference sign "Rd" in FIG. 2), or cross-sectional area of the opening 36a. It is therefore desirable to determine the linear function (F1), the function (F2), and the threshold ($G_{TH}$) in advance, for each nozzle 36 used in the laser processing machine 100. In other words, the proportional intercept β of the linear function (F1), $a_k$ (k=0 to n) of the function (F2), and the threshold ($G_{TH}$) are determined in advance for each nozzle 36 by means of experiments or simulations. Then, these parameters are stored in the storage unit in association with identification numbers of the nozzles 36.

Figure 3A:
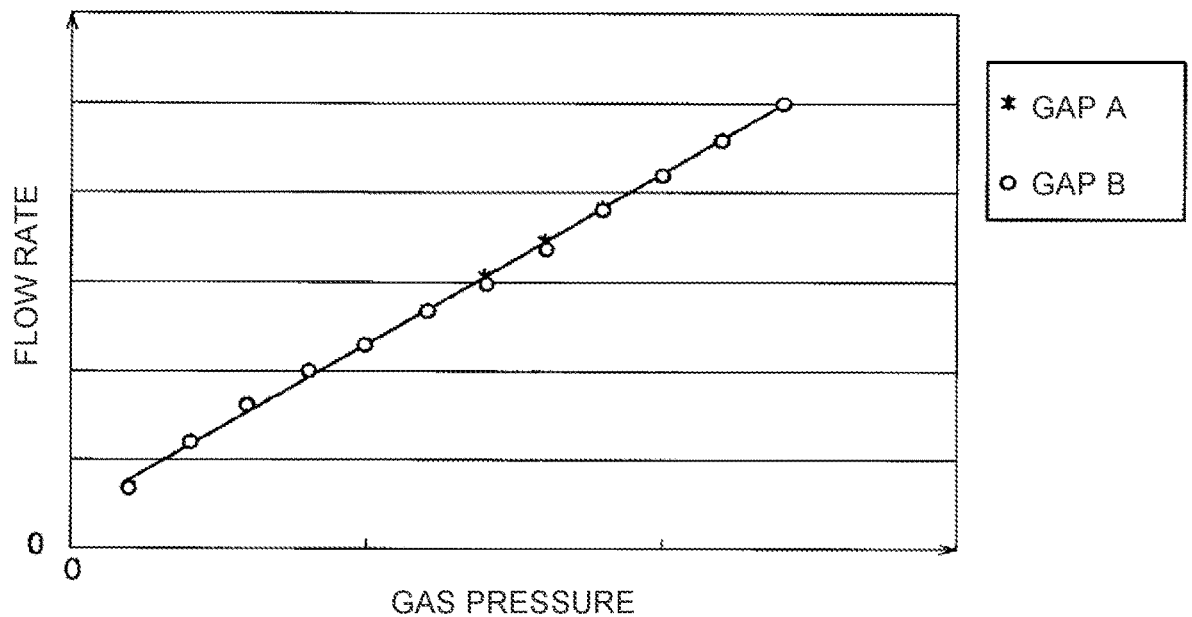
FIG. 3A is a graph showing that a relationship between a pressure (P) of an assist gas and a flow rate (H) of the assist gas does not change even if the gap values (A, B) are different.
Figure 3B:
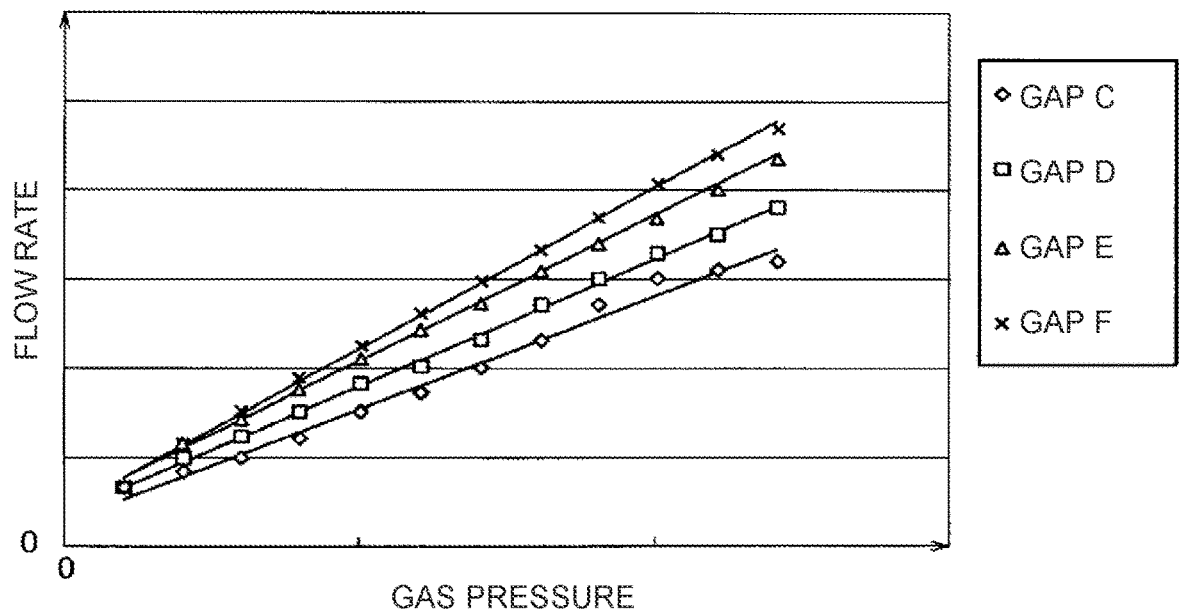
FIG. 3B is a graph showing that a relationship between the pressure (P) of the assist gas and the flow rate (H) of the assist gas changes according to the gap values (C, D, E, F).

For example, a diaphragm flow meter is arranged between the assist gas supply device 80 and the processing head 35 to measure the flow rate (H) of the assist gas. The flow rate (H) of the assist gas is measured while changing the pressure (P) of the assist gas. As shown in FIG. 3A and FIG. 3B, a linear function (approximate line) that approximates measured values (measured points) is determined for each gap value (A to F). The gap values (A to F) are different from one another. At any of the gap values (A to F), the pressure (P) of the assist gas and the flow rate (H) of the assist gas are in a proportional relationship.

If the gap values (A, B) are equal to or higher than the threshold ($G_{TH}$), the relationship between the pressure (P) of the assist gas and the flow rate (H) of the assist gas remains unchanged even if the gap values (A, B) are different, as shown in FIG. 3A. In other words, as represented in Equation (3), the slope (α) of the linear function (F1) is a constant value ($a_0$).

On the other hand, if the gap (G) is lower than the threshold ($G_{TH}$), the slope (α) of the linear function (F1) changes according to the gap values (C, D, E, F) as shown in FIG. 3B. The calculation device sets the largest value of the gap in a range of the gap (G) in which the slope (α) of the linear function (F1) changes, to the threshold ($G_{TH}$). Alternatively, the calculation device sets the smallest value of the gap in a range of the gap (G) (open gap) in which the slope (α) of the linear function (F1) does not change, to the threshold ($G_{TH}$). The calculation device sets the threshold ($G_{TH}$) for each nozzle 36. The set threshold (boundary gap) is stored in the slope calculation storage device 70 in association with the nozzle 36.

Furthermore, the calculation device can determine the proportional intercept (β) in Equation (1) from the proportional intercept of the linear function (F1) for each gap value (A to F) shown in FIG. 3A and FIG. 3B. For example, the proportional intercept (β) may be the mean or median of proportional intercepts ($\beta_A$ to $\beta_F$) for the individual gap values (A to F). By setting the proportional intercept (β) to a constant value, it is possible to reduce a calculation load for calculating the proportional intercept (β) using a calculation formula having the gap (G) as a variable. The calculation device sets the proportional intercept (β) for each nozzle 36. The set proportional intercept (β) is stored in the flow rate calculation storage device 60 in association with the nozzle 36.

Figure 4:
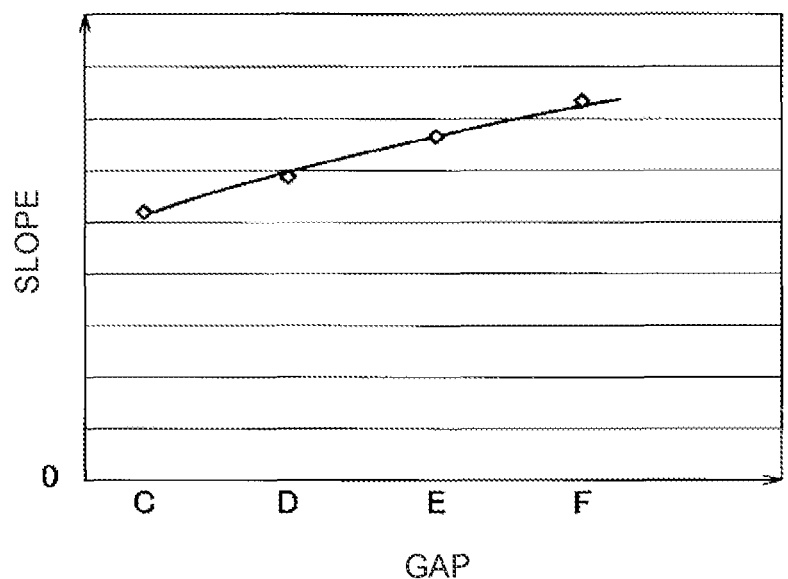
FIG. 4 is a graph showing a change in a slope (a) of a linear function (F1) for each of the gap values (C, D, E, F) lower than a threshold ($G_{TH}$).

FIG. 4 is a graph showing a change in the slope (α) of the linear function (F1) for each of the gap values (C, D, E, F) lower than the threshold ($G_{TH}$). The value of the gap increases from C to D, E, and F, in this order. The slope (α) increases as the gap (G) increases, while the rate of increase in the slope (α) decreases as the gap (G) increases. Further, if the gap (G) becomes equal to or higher than the threshold ($G_{TH}$), the slope (α) becomes a constant value ($a_0$), although not shown in FIG. 4. The calculation device determines the function (F2) that approximates the change in the slope (α) with respect to the gap (G) for each nozzle 36 in advance by means of experiments or simulations. In the example shown in FIG. 4, the change in the slope (α) with respect to the gap (G) is approximated by a quadratic function (F2) in a range where the gap (G) is lower than the threshold ($G_{TH}$). The function (F2) is stored in the slope calculation storage device 70 in association with the nozzle 36.

Here, the flow rate (H) of the assist gas indicates a volume of the assist gas ejected through the opening 36a of the nozzle 36 per unit time. The calculation device can determine a consumption of the assist gas by multiplying the flow rate (H) of the assist gas by a time period during which the assist gas is ejected. Since the ease of flow of the gas varies depending on the type of gas, the calculation device can accurately determine a consumption of an assist gas corresponding to the type of gas by further multiplying a predetermined coefficient for each type of gas.

Figure 5:
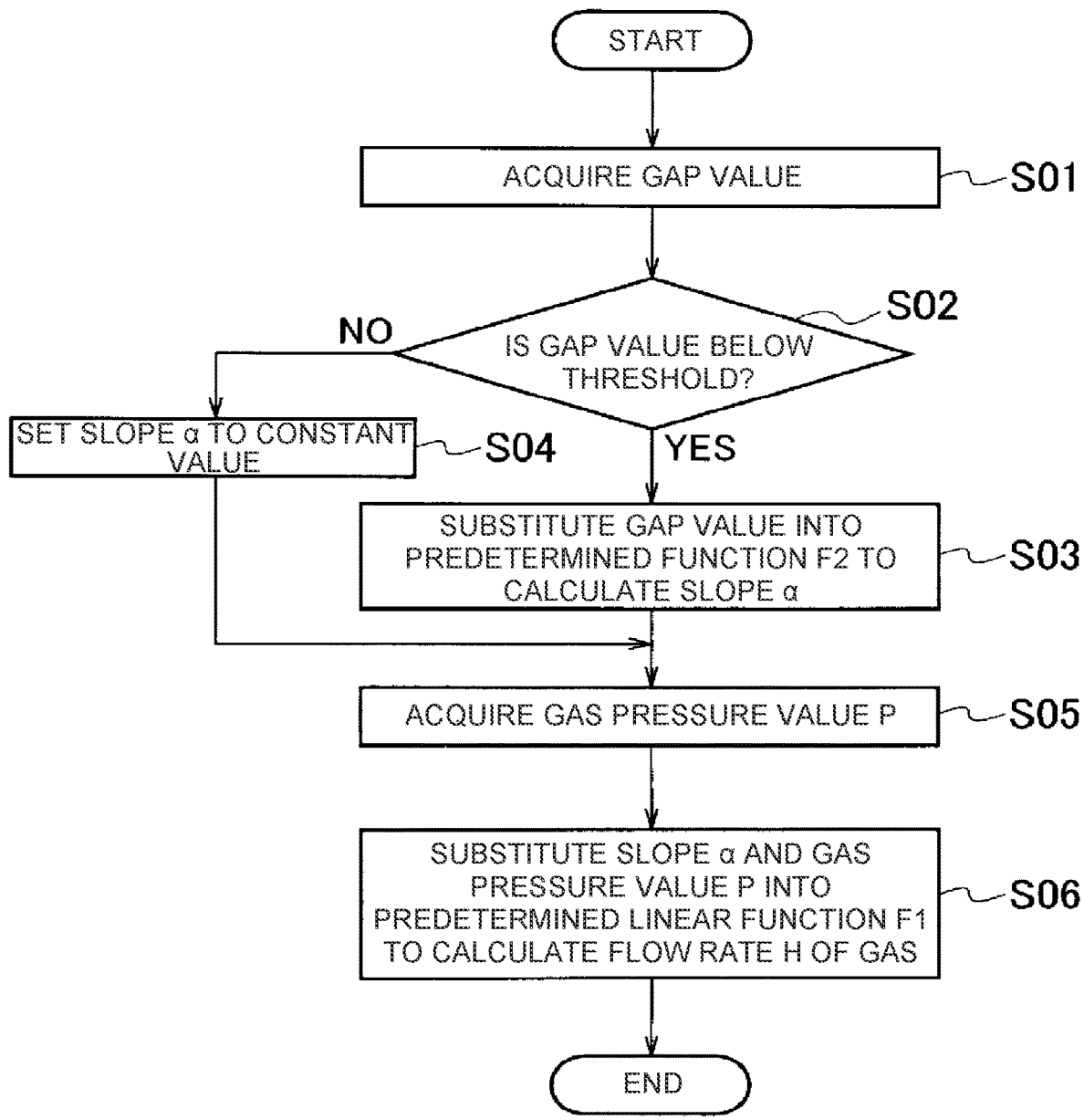
FIG. 5 is a flowchart showing an assist gas flow rate calculation method according to the first embodiment.

Next, an embodiment of the assist gas flow rate calculation method will be described with reference to FIG. 5. First, in step S01, the control unit of the calculation device controls the gap measuring instrument 38 to measure the gap (G), which is a distance in the Z-axis direction from the tip end of the nozzle 36 to the surface of the sheet metal W. Then, the control unit acquires data indicating a value of the gap (G).

Although not shown, the control unit acquires data indicating the identification number of the nozzle 36 attached to the processing head 35.

Proceeding to step S02, the control unit reads the threshold ($G_{TH}$) associated with the nozzle 36 by searching the slope calculation storage device 70 for the identification number of the nozzle 36. It is determined whether the value of the gap (G) is lower than the threshold ($G_{TH}$). If the value of the gap (G) is lower than the threshold ($G_{TH}$) (YES in S02), the process proceeds to step S03. If the value of the gap (G) is equal to or higher than the threshold ($G_{TH}$) (NO in S02), the process proceeds to step S04.

In step S03, the control unit reads the function (F2) represented in Equation (2) associated with the nozzle 36 by searching the slope calculation storage device 70 for the identification number of the nozzle 36. The control unit calculates the slope (α) of the linear function (F1) by substituting the value of the gap (G) into the function (F2) to execute the second computer program. Then, the process proceeds to step S05.

On the other hand, in step S04, the function (F2) shown in Equation (3) associated with the nozzle 36, that is, the constant ($a_0$) is read and set to the slope (α). Then, the process proceeds to step S05.

In step S05, the control unit controls the pressure gauge 37 to measure the pressure (P) of the assist gas inside the processing head 35 and the nozzle 36. Then, the control unit acquires data indicating a value of the pressure (P). Proceeding to step S06, the control unit substitutes the slope (α) determined in step S03 or S04 and the value of the pressure (P) acquired in step S05 into the linear function (F1) represented in Equation (1) to execute the first computer program, so that the flow rate (H) of the assist gas is calculated.

Thus, according to the first embodiment, the following advantageous effects can be achieved.

The storage units (60, 70) of the computer store the first computer program that calculates the flow rate (H) of the assist gas using the linear function (F1) having the pressure (P) of the assist gas in the processing head 35 as a variable, and the second computer program that calculates the slope (α) of the linear function (F1) using the function (F2) having the gap (G) from the tip end of the nozzle 36 to the surface of the sheet metal W (workpiece) as a variable. The control unit of the computer calculates the slope (α) by substituting the value of the gap (G) into the function (F2) to execute the second computer program and calculates the flow rate (H) by substituting the slope (α) and the value of the pressure (P) into the linear function (F1) to execute the first computer program. Since the slope (α) of the linear function (F1) is determined according to the value of the gap (G), the flow rate of the assist gas in laser processing can be calculated accurately.

Here, instead of acquiring a value of the gap (G) measured by the gap measuring instrument 38, the control unit may acquire a value of the gap (G) specified in processing conditions for processing a predetermined sheet metal W. Alternatively, a value of the gap (G) input via the operation unit 40 by the user of the calculation device may be acquired. Instead of acquiring a value of the pressure (P) measured by the pressure gauge 37, the control unit may acquire a value of the pressure (P) specified in processing conditions for processing a sheet metal W. Alternatively, a value of the pressure (P) input via the operation unit 40 by the user of the calculation device may be acquired.

If the value of the gap (G) is lower than the threshold ($G_{TH}$), the control unit calculates the slope (α) by substituting the value of the gap (G) into the function (F2) to execute the second computer program. If the value of the gap (G) is equal to or higher than the threshold ($G_{TH}$), the control unit sets the slope (α) to a constant value ($a_0$). The flow rate of the assist gas can be calculated more accurately by changing the method of calculating the slope (α) depending on whether the value of the gap (G) is an open gap. The "open gap" is a gap in which the proportional coefficient (a) of Equation (1) is a constant value. The threshold ($G_{TH}$) corresponds to the minimum value (boundary gap) of the open gap.

The threshold ($G_{TH}$) is the largest value of the gap in a range of the gap in which the flow rate (H) changes as the gap (G) changes. The threshold ($G_{TH}$) is the largest value of the gap in a range of the gap (G) in which the flow rate (H) changes as the gap (G) changes while keeping the pressure (P) constant. As a result, the threshold ($G_{TH}$) can be set appropriately.

The threshold ($G_{TH}$) varies for each type of the nozzle 36. The ease of flow of the assist gas flowing in the nozzle 36 changes depending on the type of the nozzle 36. Since the threshold ($G_{TH}$) also changes according to the ease of flow of the assist gas, the threshold ($G_{TH}$) can be set appropriately. Nozzle types include single nozzle and multiple nozzle. As shown in FIG. 2, the single nozzle is a nozzle in which the tip end of the nozzle has a single cylinder. The multiple nozzle is a nozzle in which a plurality of cylinders having different diameters are arranged at the tip end of the nozzle. FIG. 6 shows a double nozzle 26 in which two cylinders (3, 5) are arranged, as an example of the multiple nozzle.

As shown in FIG. 6, the laser beam LB oscillated from the laser oscillator 10 is applied on the sheet metal W. The assist gas is supplied from the assist gas supply device 80 into an inner nozzle 3, so that some of the assist gas is ejected through a nozzle port 15 of the inner nozzle 3. Further, the rest of the assist gas is ejected from a communication hole 11 into an assist gas passage 7 and is then ejected from a nozzle port 17 of an outer nozzle 5 to a laser processing position of the sheet metal W. As described above, the ease of flow of the assist gas flowing in the nozzles (26, 36) varies depending on the nozzle type. Here, a "nozzle opening" in the multiple nozzle is an opening of the outermost cylinder. In the double nozzle of FIG. 6, the nozzle port 17 of the outer nozzle 5 corresponds to an opening of the outermost cylinder, that is, the "nozzle opening".

The threshold ($G_{TH}$) varies depending on the size of the opening 36a of the nozzle 36 through which the assist gas is ejected. The ease of flow of the gas ejected through the opening 36a of the nozzle 36 changes depending on the size of the opening 36a of the nozzle 36. Since the threshold ($G_H$) also changes according to the ease of flow of the gas, the threshold ($G_{TH}$) can be set appropriately.

Second Embodiment

The calculation device and calculation method described in the first embodiment can be applied to a nozzle 36 for which parameters of the linear function (F1) and the function (F2), that is, the proportional intercept § of the linear function (F1), ax (k=0 to n) of the function (F2), and the threshold ($G_{TH}$) have been stored in the secondary storage device in advance (such a nozzle is referred to as a "known nozzle").

The second embodiment describes a specific approach of applying a calculation device and a calculation method according to an embodiment for the nozzle 36 for which parameters necessary for calculating the flow rate of the assist gas have not yet been determined (this is referred to as an "unknown nozzle").

Note that the second embodiment is not intended to limit the assist gas flow rate calculation method for the unknown nozzle. As an alternative to the second embodiment, for example, the flow rate of the assist gas for the unknown nozzle may be calculated by utilizing parameters defined for a known nozzle having a nozzle type, an opening size, and the like similar to those of the unknown nozzle. The assist gas flow rate calculation device and calculation method according to the second embodiment can also be applied to the laser processing machine described in the first embodiment.

As in the first embodiment, the assist gas flow rate calculation device according to the second embodiment also includes a plurality of information processing circuits (control units) constituted by the NC device 50, and a secondary storage device (storage unit) for storing electronic data. The specific configuration of the hardware is not limited to that illustrated here.

The calculation device first determines whether the nozzles (26, 36) are known nozzles or unknown nozzles. Specifically, the secondary storage device is searched for the identification numbers of the nozzles (26, 36) to determine whether parameters necessary for calculating the flow rate of the assist gas have been stored. The calculation device determines that the nozzles (26, 36) are unknown nozzles if the parameters have not been stored.

Next, the calculation device acquires data showing a cross-sectional area ($C_O$) of an opening 36a of a known nozzle of the same type as the unknown nozzle and data showing a cross-sectional area ($C_I$) of the opening 36a of the unknown nozzle. For example, the calculation device can search the secondary storage device and read data indicating the cross-sectional area ($C_O$) of the opening 36a of the known nozzle of the same type as the unknown nozzle. Additionally, the cross-sectional area ($C_I$) of the opening 36a of the unknown nozzle input via the operation unit 40 by the user of the calculation device may be acquired. Alternatively, in a case where the laser processing machine is equipped with a camera capable of imaging the opening 36a of the nozzles (26, 36), the cross-sectional area ($C_I$) of the opening 36a may be calculated from the image acquired by the camera.

The calculation device calculates the flow rate ($H_O$) of the assist gas when the known nozzle of the same type as the unknown nozzle is used. Specifically, the calculation device calculates the flow rate ($H_O$) of the assist gas by the method described in the first embodiment. The acquisition of the data indicating the cross-sectional area and the calculation of the flow rate of the known nozzles may be performed in any sequence.

The calculation device calculates the flow rate ($H_I$) of the assist gas when the unknown nozzle is used, based on (a-1) to (c):

(a-1) the cross-sectional area ($C_O$) of the opening 36a of the known nozzle of the same type as the unknown nozzle;

(b) the cross-sectional area ($C_I$) of the opening 36a of the unknown nozzle; and (c) the flow rate ($H_O$) of the assist gas when the known nozzle of the same type as the unknown nozzle is used.

For example, the calculation device calculates the flow rate ($H_I$) of the assist gas when the unknown nozzle is used, by multiplying the flow rate ($H_O$) of the assist gas when the known nozzle is used by a ratio of the cross-sectional area ($C_I$) of the opening 36a of the unknown nozzle to the cross-sectional area ($C_O$) of the opening 36a of the known nozzle. This calculation formula is represented in Equation (4).

$$H_I = H_O \times (C_I/C_O) \qquad \text{Equation (4)}$$

In a case where a plurality of known nozzles of the same type as the unknown nozzle have been stored in the secondary storage device, the calculation device may select a nozzle having an opening 36a having a cross-sectional area closest to that of the unknown nozzle, among the plurality of known nozzles.

Therefore, in this case, the calculation device calculates the flow rate of the assist gas when the unknown nozzle is used, based on (a-2) to (c):

(a-2) the cross-sectional area of the opening 36a of the known nozzle that is of the same type as the unknown nozzle and has the opening 36a having a cross-sectional area size closest to that of the unknown nozzle, among known nozzles stored in the storage unit;

(b) the cross-sectional area of the opening 36a of the unknown nozzle; and (c) the flow rate of the assist gas when the known nozzle of the same type as the unknown nozzle is used.

Figure 7A:
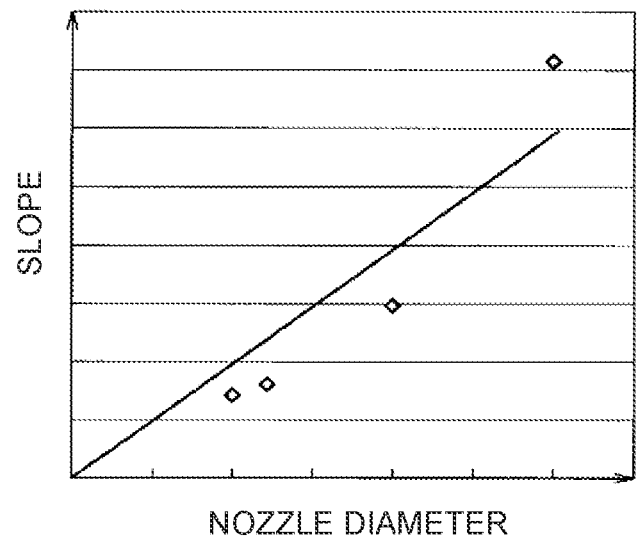
FIG. 7A is a graph showing a relationship between a diameter of an opening of a single nozzle and a slope ($\alpha$) of a linear function (F1), and shows a plurality of measured points and a line segment that approximates them.
Figure 7B:
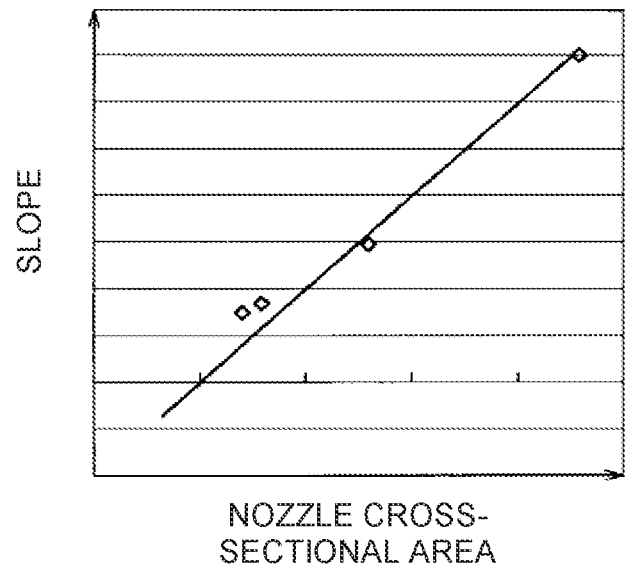
FIG. 7B is a graph showing a relationship between a cross-sectional area of an opening of a single nozzle and a slope ($\alpha$) of a linear function (F1), and shows a plurality of measured points and a line segment that approximates them.
Figure 8A:
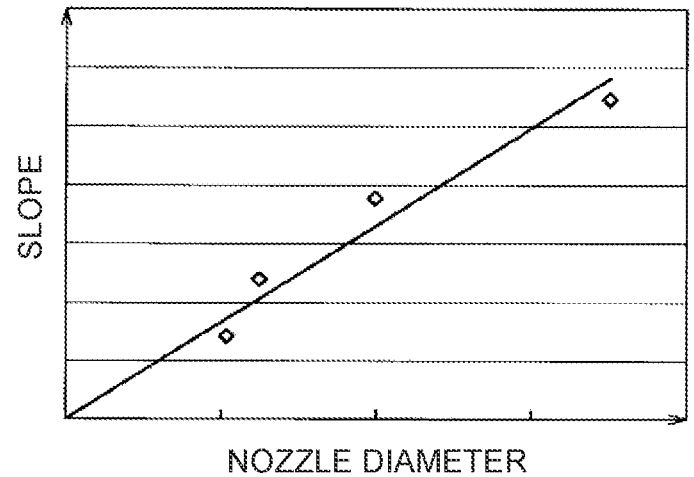
FIG. 8A is a graph showing a relationship between a diameter of an opening of a double nozzle and a slope ($\alpha$) of a linear function (F1), and shows a plurality of measured points and a line segment that approximates them.
Figure 8B:
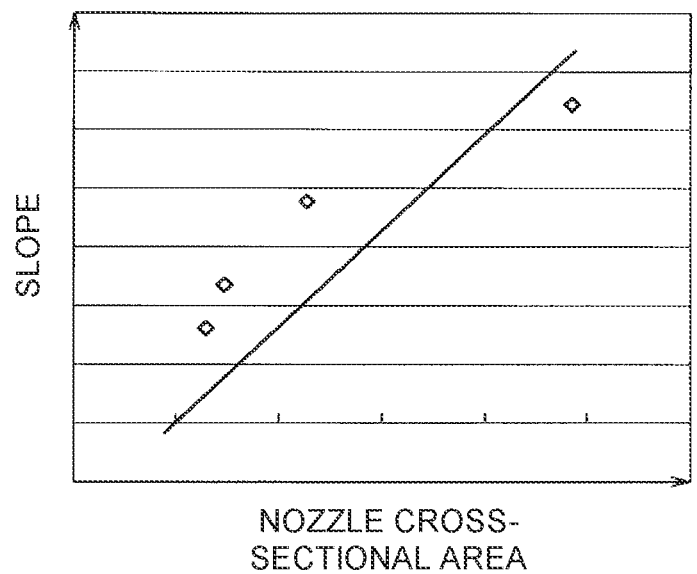
FIG. 8B is a graph showing a relationship between a cross-sectional area of an opening of a double nozzle and a slope ($\alpha$) of a linear function (F1), and shows a plurality of measured points and a line segment that approximates them.

FIG. 7B is a graph showing a relationship between a cross-sectional area of an opening 36a of a single nozzle and a slope (α) of a linear function (F1), and shows a plurality of measured points and a line segment that approximates them. FIG. 8B is a graph showing a relationship between a cross-sectional area of an opening 36a of a double nozzle and a slope (α) of a linear function (F1), and shows a plurality of measured points and a line segment that approximates them. As shown in FIG. 7B and FIG. 8B, the inventors of the present application have found that there is a proportional relationship between the cross-sectional area of the opening 36a of the nozzle and the slope (α) of the linear function (F1) regardless of the nozzle type. Based on this finding, the inventors have invented a calculation method of calculating the flow rate ($H_I$) of the assist gas when the unknown nozzle is used, based on the ratio of the cross-sectional area ($C_I$) of the opening 36a of the unknown nozzle to the cross-sectional area ($C_O$) of the opening 36a of the known nozzle.

<Modification>

The second embodiment has illustrated an example of calculating the flow rate of the assist gas with reference to the cross-sectional area of the opening 36a of the unknown nozzle. However, a diameter of the opening 36a may be used instead of the cross-sectional area of the opening 36a.

The calculation device acquires diameters ($R_O$, $R_I$) of the openings 36a of the known nozzle and the unknown nozzle to determine the flow rate ($H_O$) of the assist gas when the known nozzle is used, in the same method as in acquiring the cross-sectional area of the opening 36a.

The calculation device calculates the flow rate ($H_I$) of the assist gas when the unknown nozzle is used, based on (d-1) to (f):

(d-1) the diameter of the opening 36a of the known nozzle of the same type as the unknown nozzle;

(e) the diameter of the opening 36a of the unknown nozzle; and (f) the flow rate of the assist gas when the known nozzle of the same type as the unknown nozzle is used.

For example, the calculation device calculates the flow rate ($H_I$) of the assist gas when the unknown nozzle is used, by multiplying the flow rate ($H_O$) of the assist gas when the known nozzle is used by a ratio of the diameter ($R_I$) of the opening 36a of the unknown nozzle to the diameter ($R_O$) of the opening 36a of the known nozzle. This calculation formula is represented in Equation (5).

$$H_I = H_O \times (R_I/R_O) \quad \text{Equation (5)}$$

In a case where a plurality of known nozzles of the same type as the unknown nozzle have been stored in the secondary storage device, the calculation device may only select a nozzle having an opening 36a having a diameter size closest to that of the unknown nozzle, among the plurality of known nozzles.

Therefore, the calculation device calculates the flow rate of the assist gas when the unknown nozzle is used, based on (d-2) to (f):

(d-2) the diameter of the opening 36a of the known nozzle that is of the same type as the unknown nozzle and has the opening 36a having a diameter size closest to that of the unknown nozzle, among known nozzles stored int the secondary storage unit;

(e) the diameter of the opening 36a of the unknown nozzle; and (f) the flow rate of the assist gas when a known nozzle of the same type as the unknown nozzle is used.

FIG. 7A is a graph showing a relationship between a diameter of an opening 36a of a single nozzle and a slope (α) of a linear function (F1), and shows a plurality of measured points and a line segment that approximates them. FIG. 8A is a graph showing a relationship between a diameter of an opening 36a of a double nozzle and a slope (α) of a linear function (F1), and shows a plurality of measured points and a line segment that approximates them. As shown in FIG. 7A and FIG. 8A, the inventors of the present application have found that there is a proportional relationship between the diameter of the opening 36a of the nozzle and the slope (α) of the linear function (F1) regardless of the nozzle type. Based on this finding, the inventors have invented a calculation method of calculating the flow rate ($H_I$) of the assist gas when the unknown nozzle is used, based on the ratio of the diameter ($R_I$) of the opening 36a of the unknown nozzle to the diameter ($R_O$) of the opening 36a of the known nozzle.

<Selection of Calculation Method Depending on the Type of Unknown Nozzle>

The method of calculating the flow rate of the unknown nozzles described in the second embodiment and its modification may be applied to both single nozzles and multiple nozzles. In other words, regardless of whether the unknown nozzle is a single nozzle or a multiple nozzle, the calculation methods of both the second embodiment and its modification may be applied.

However, as described below, it is also possible to use the calculation method in the second embodiment (cross-sectional area) or the calculation method in the modification (diameter), depending on the type of the unknown nozzle.

When the type of the unknown nozzle is single nozzle, it is desirable to apply the calculation method based on the cross-sectional area of the opening 36a of the nozzle, that is, the calculation method described in the second embodiment. On the other hand, when the type of the unknown nozzle is multiple nozzle, it is desirable to apply the calculation method based on the diameter of the opening 36a of the nozzle, that is, the calculation method described in the modification.

Comparing FIG. 7A and FIG. 7B, a distance from an approximate line to the measured points is shorter in FIG. 7B. In other words, a standard deviation of the measured points with reference to the approximate line is smaller in FIG. 7B than in FIG. 7A. Therefore, when the type of the unknown nozzle is single nozzle, the flow rate of the assist gas can be calculated more accurately by selecting the calculation method based on the cross-sectional area of the opening 36a (second embodiment).

Comparing FIG. 8A and FIG. 8B, a distance from an approximate line to the measured points is shorter in FIG. 8A. In other words, a standard deviation of the measured points with reference to the approximate line is smaller in FIG. 8A than in FIG. 8B. Therefore, when the type of the unknown nozzle is multiple nozzle including double nozzle, the flow rate of the assist gas can be calculated more accurately by selecting the calculation method based on the diameter of the opening 36a (modification).

Thus, according to the second embodiment and the modification, the following advantageous effects can be achieved.

For the unknown nozzle, there is no need for experiments or simulations to determine the parameters of the linear function (F1) and the function (F2), that is, the proportional intercept β of the linear function (F1), $a_k$ (k=0 to n) of the function (F2), and the threshold ($G_{TH}$). The calculation device can be quickly adapted to evolving and improved novel nozzles 36.

The secondary storage device stores the linear function (F1) and the function (F2) for each nozzle 36. The control unit calculates the flow rate of the assist gas when the unknown nozzle for which the linear function (F1) and the function (F2) are not stored is used, based on (a-1) to (c) or (d-1) to (f) described above. As a result, the flow rate of the assist gas when the unknown nozzle is used can be calculated accurately.

When the type of the unknown nozzle is single nozzle, the flow rate calculation method based on the cross-sectional area of the opening 36a is applied. As shown in FIG. 7A and FIG. 7B, the flow rate can be calculated more accurately.

When the type of the unknown nozzle is multiple nozzle, the flow rate calculation method based on the diameter of the opening 36a is applied. As shown in FIG. 8A and FIG. 8B, the flow rate can be calculated more accurately.

When there are a plurality of known nozzles of the same type as the unknown nozzle, the control unit calculates the flow rate of the assist gas based on the cross-sectional area of the opening 36a of the known nozzle having the opening 36a having a cross-sectional area size closest to that of the unknown nozzle. Alternatively, when there are a plurality of known nozzles of the same type as the unknown nozzle, the control unit calculates the flow rate of the assist gas based on the diameter of the opening 36a of the known nozzle having the opening 36a having a diameter size closest to that of the unknown nozzle. As a result, even when there are a plurality of known nozzles of the same type as the unknown nozzle, the flow rate of the assist gas when the unknown nozzle is used can be calculated accurately.

The calculation device calculates the flow rate of the assist gas when the unknown nozzle is used, by multiplying the flow rate ($H_O$) when the known nozzle is used by a ratio of the cross-sectional area ($C_I$) of the opening 36a of the unknown nozzle to the cross-sectional area ($C_O$) of the opening 36a of the known nozzle. Alternatively, the calculation device calculates the flow rate of the assist gas when the unknown nozzle is used, by multiplying the flow rate ($H_O$) when the known nozzle is used by a ratio of the diameter ($R_I$) of the opening 36a of the unknown nozzle to the diameter ($R_O$) of the opening 36a of the known nozzle. According to Equation (4) or (5), the flow rate of the assist gas when the unknown nozzle is used can be calculated accurately.

The present invention is not limited to the present embodiment described above, and various modifications may be made without departing from the summary of the present invention.

REFERENCE SIGNS LIST 3, 5 multiple cylinders
10 laser oscillator
17 nozzle port (nozzle opening)
26 double nozzle (nozzle)
35 processing head
36 single nozzle (nozzle)
36a nozzle opening
50 NC device (control unit)
60 flow rate calculation storage device (storage unit)
70 slope calculation storage device (storage unit)
F1 linear function
F2 function
G gap
H flow rate of assist gas
LB laser beam
P pressure of assist gas
Rd opening diameter
W sheet metal (workpiece)
α slope

The invention claimed is:

1. A device for calculating a flow rate of an assist gas ejected from a tip end of a nozzle attached to a processing head in laser processing in which a laser beam guided from a laser oscillator to the processing head is applied on a workpiece to perform desired processing, the assist gas flow rate calculation device comprising a control unit and a storage unit,
  the storage unit storing
    a first computer program calculating the flow rate using a linear function having a pressure of the assist gas in the processing head as a variable, and
    a second computer program calculating a slope of the linear function using a function having a gap from the tip end of the nozzle to a surface of the workpiece as a variable,
  the control unit being configured to
  acquire data indicating a value of the gap,
  calculate the slope by substituting the value of the gap into the function to execute the second computer program,
  acquire data showing a value of the pressure, and
  calculate the flow rate by substituting the slope and the value of the pressure into the linear function to execute the first computer program,
  wherein
  the processing head uses a plurality of nozzles,
  the storage unit stores the linear function and the function for each known nozzle among the plurality of nozzles,
  the control unit is configured to calculate the flow rate when among the plurality of nozzles an unknown nozzle for which the linear function and the function are not stored is used, based on
    a cross-sectional area of an opening of a known nozzle of a type same as a type of the unknown nozzle, among known nozzles for which the linear function and the function are stored in the storage unit,
    a cross-sectional area of an opening of the unknown nozzle, and
    the flow rate when the known nozzle of the type same as the type of the unknown nozzle is used.

2. The assist gas flow rate calculation device according to claim 1, wherein
  in a case where the value of the gap is lower than a threshold, the slope is calculated by substituting the value of the gap into the function to execute the second computer program, and
  in a case where the value of the gap is equal to or higher than the threshold, the slope is set to a constant value.

3. The assist gas flow rate calculation device according to claim 2, wherein the threshold is a largest value of the gap in a range of the gap in which the flow rate changes as the gap changes.

4. The assist gas flow rate calculation device according to claim 3, wherein the threshold changes depending on a type of the nozzle.

5. The assist gas flow rate calculation device according to claim 3, wherein the threshold changes depending on a size of an opening of the nozzle through which the assist gas is ejected.

6. The assist gas flow rate calculation device according to claim 1, wherein the type of the nozzles is single nozzle in which the tip end of the nozzle has a single cylinder.

7. The assist gas flow rate calculation device according to claim 1, wherein the control unit is configured to calculate the flow rate when the unknown nozzle is used, based on a cross-sectional area of an opening of a known nozzle, the known nozzle being of the type same as the type of the unknown nozzle and having the opening having a cross-sectional area size closest to a cross-sectional area size of the opening of the unknown nozzle, among the known nozzles for which the linear function and the function are stored in the storage unit.

8. The assist gas flow rate calculation device according to claim 1, wherein the control unit is configured to calculate the flow rate when the unknown nozzle is used, by multiplying the flow rate when the known nozzle is used by a ratio of the cross-sectional area of the opening of the unknown nozzle to the cross-sectional area of the opening of the known nozzle.

9. The assist gas flow rate calculation device according to claim 1, wherein a proportional intercept of the linear function is an average or a median of proportional intercepts changing for individual gaps.

10. A device for calculating a flow rate of an assist gas ejected from a tip end of a nozzle attached to a processing head in laser processing in which a laser beam guided from a laser oscillator to the processing head is applied on a workpiece to perform desired processing, the assist gas flow rate calculation device comprising a control unit and a storage unit,
the storage unit storing
a first computer program calculating the flow rate using a linear function having a pressure of the assist gas in the processing head as a variable, and
a second computer program calculating a slope of the linear function using a function having a gap from the tip end of the nozzle to a surface of the workpiece as a variable,
the control unit being configured to
acquire data indicating a value of the gap,
calculate the slope by substituting the value of the gap into the function to execute the second computer program,
acquire data showing a value of the pressure, and
calculate the flow rate by substituting the slope and the value of the pressure into the linear function to execute the first computer program,
wherein
the processing head uses a plurality of nozzles,
the storage unit stores the linear function and the function for each known nozzle among the plurality of nozzles, and
the control unit is configured to calculate the flow rate when among the plurality of nozzles an unknown nozzle for which the linear function and the function are not stored is used, based on
a diameter of an opening of a known nozzle of a type same as a type of the unknown nozzle, among known nozzles for which the linear function and the function are stored in the storage unit,
a diameter of an opening of the unknown nozzle, and
the flow rate when the known nozzle of the type same as the type of the unknown nozzle is used.

11. The assist gas flow rate calculation device according to claim 10, wherein the type of the nozzles is multiple nozzle in which a plurality of cylinders having different diameters are arranged at the tip end of the nozzle.

12. The assist gas flow rate calculation device according to claim 10, wherein the control unit is configured to calculate the flow rate when the unknown nozzle is used, based on a diameter of an opening of a known nozzle, the known nozzle being of the type same as the type of the unknown nozzle and having the opening having a diameter size closest to a diameter size of the opening of the unknown nozzle, among the known nozzles for which the linear function and the function are stored in the storage unit.

13. The assist gas flow rate calculation device according to claim 10, wherein the control unit is configured to calculate the flow rate when the unknown nozzle is used, by multiplying the flow rate when the known nozzle is used by a ratio of the diameter of the opening of the unknown nozzle to the diameter of the opening of the known nozzle.

14. A method of calculating, using a control unit and a storage unit, a flow rate of an assist gas ejected from a tip end of a nozzle attached to a processing head in laser processing in which a laser beam guided from a laser oscillator to the processing head is applied on a workpiece to perform desired processing,
the storage unit storing
a first computer program calculating the flow rate using a linear function having a pressure of the assist gas in the processing head as a variable, and
a second computer program calculating a slope of the linear function using a function having a gap from the tip end of the nozzle to a surface of the workpiece as a variable,
the control unit
acquiring data indicating a value of the gap,
calculating the slope by substituting the value of the gap into the function to execute the second computer program,
acquiring data showing a value of the pressure, and
calculating the flow rate by substituting the slope and the value of the pressure into the linear function to execute the first computer program,
wherein
the processing head uses a plurality of nozzles,
the storage unit stores the linear function and the function for each known nozzle among the plurality of nozzles, and
the control unit calculates the flow rate when among the plurality of nozzles an unknown nozzle for which the linear function and the function are not stored is used, based on
a cross-sectional area of an opening of a known nozzle of a type same as a type of the unknown nozzle, among known nozzles for which the linear function and the function are stored in the storage unit,
a cross-sectional area of an opening of the unknown nozzle, and
the flow rate when the known nozzle of the type same as the type of the unknown nozzle is used.

15. A method of calculating, using a control unit and a storage unit, a flow rate of an assist gas ejected from a tip end of a nozzle attached to a processing head in laser processing in which a laser beam guided from a laser oscillator to the processing head is applied on a workpiece to perform desired processing,
the storage unit storing
a first computer program calculating the flow rate using a linear function having a pressure of the assist gas in the processing head as a variable, and
a second computer program calculating a slope of the linear function using a function having a gap from the tip end of the nozzle to a surface of the workpiece as a variable,
the control unit
acquiring data indicating a value of the gap,
calculating the slope by substituting the value of the gap into the function to execute the second computer program, acquire data showing a value of the pressure, and
calculating the flow rate by substituting the slope and the value of the pressure into the linear function to execute the first computer program,
wherein
the processing head uses a plurality of nozzles,
the storage unit stores the linear function and the function for each known nozzle among the plurality of nozzles, and
the control unit calculates the flow rate when among the plurality of nozzles an unknown nozzle for which the linear function and the function are not stored is used, based on
a diameter of an opening of a known nozzle of a type same as a type of the unknown nozzle, among known nozzles for which the linear function and the function are stored in the storage unit,
a diameter of an opening of the unknown nozzle, and
the flow rate when the known nozzle of the type same as the type of the unknown nozzle is used.

* * * * *